United States Patent
Gourlay et al.

(10) Patent No.: US 11,075,948 B2
(45) Date of Patent: Jul. 27, 2021

(54) METHOD AND SYSTEM FOR VIRTUAL MACHINE AWARE POLICY MANAGEMENT

(71) Applicant: Arista Networks, Inc., Santa Clara, CA (US)

(72) Inventors: Douglas Alan Gourlay, San Francisco, CA (US); Kenneth James Duda, Santa Clara, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 1227 days.

(21) Appl. No.: 14/592,931

(22) Filed: Jan. 9, 2015

(65) Prior Publication Data

US 2015/0200808 A1     Jul. 16, 2015

Related U.S. Application Data

(60) Provisional application No. 61/925,910, filed on Jan. 10, 2014.

(51) Int. Cl.
*H04L 12/24* (2006.01)
*H04L 12/927* (2013.01)
(Continued)

(52) U.S. Cl.
CPC .......... *H04L 63/20* (2013.01); *H04L 41/0816* (2013.01); *H04L 41/0893* (2013.01);
(Continued)

(58) Field of Classification Search
CPC ...... H04L 41/0816; H04L 47/80; H04L 67/10
(Continued)

(56) References Cited

U.S. PATENT DOCUMENTS

| 9,350,608 B2 | 5/2016 | Gourlay et al. |
| 2010/0205303 A1* | 8/2010 | Chaturvedi ............. G06F 21/10 709/226 |

(Continued)

OTHER PUBLICATIONS

Mahalingam, M. et al., "Virtual Extensible Local Area Network (VXLAN): A Framework for Overlaying Virtualized Layer 2 Networks over Layer 3 Networks", retrieved at http://tools.ietf.org/html/rfc7348, Aug. 2014 (22 pages).

*Primary Examiner* — Philip J Chea
*Assistant Examiner* — Hassan A Khan
(74) *Attorney, Agent, or Firm* — Chamberlain, Hrdlicka, White, Williams & Aughtry

(57) ABSTRACT

A method and system for maintaining persistent network policies for a virtual machine (VM) that includes determining a name of the VM executing on a first host connected to a first network device; binding the name of the VM to a network policy for the VM on the first network device; acquiring from VM management software, using the name of the VM, a universally unique identifier (UUID) of the VM; associating the UUID to the network policy on the first network device; applying the network policy for the VM on the first network device; subscribing to receive notifications from the VM management software of changes to the configuration of the VM corresponding to the UUID; receiving notification from the VM management software of a configuration change made to the VM corresponding to the UUID; and updating the network policy of the VM to reflect the configuration change of the VM.

17 Claims, 6 Drawing Sheets

(51) Int. Cl.
*H04L 29/08* (2006.01)
*H04L 29/06* (2006.01)
*H04L 12/931* (2013.01)
*H04L 12/813* (2013.01)
*H04L 12/721* (2013.01)
*H04L 12/741* (2013.01)

(52) U.S. Cl.
CPC .............. *H04L 45/72* (2013.01); *H04L 45/74* (2013.01); *H04L 47/20* (2013.01); *H04L 47/80* (2013.01); *H04L 49/354* (2013.01); *H04L 49/70* (2013.01); *H04L 63/0876* (2013.01); *H04L 63/10* (2013.01); *H04L 63/123* (2013.01)

(58) Field of Classification Search
USPC ....................................................... 709/225
See application file for complete search history.

(56) References Cited

U.S. PATENT DOCUMENTS

| | | | |
|---|---|---|---|
| 2010/0332637 A1* | 12/2010 | Doi | G06F 9/45558 709/223 |
| 2011/0085563 A1* | 4/2011 | Kotha | H04L 49/70 370/401 |
| 2011/0106929 A1* | 5/2011 | Lee | G06F 9/45533 709/223 |
| 2011/0238820 A1* | 9/2011 | Matsuoka | G06F 11/3079 709/224 |
| 2013/0254891 A1* | 9/2013 | Onoda | G06F 21/55 726/23 |
| 2014/0122672 A1* | 5/2014 | Chen | G06F 9/45558 709/221 |
| 2014/0123211 A1 | 5/2014 | Wanser et al. | |
| 2014/0123212 A1 | 5/2014 | Wanser et al. | |
| 2014/0133358 A1* | 5/2014 | Yin | H04L 41/12 370/254 |
| 2014/0269702 A1 | 9/2014 | Moreno et al. | |
| 2014/0337497 A1 | 11/2014 | Wanser et al. | |
| 2014/0359620 A1* | 12/2014 | Van Kerkwyk | G06F 9/45533 718/1 |
| 2014/0369345 A1 | 12/2014 | Yang et al. | |
| 2014/0380079 A1* | 12/2014 | Katano | G06F 11/1441 713/330 |
| 2015/0009992 A1 | 1/2015 | Zhang | |
| 2015/0063102 A1 | 3/2015 | Mestery et al. | |
| 2015/0124814 A1* | 5/2015 | De Silva | H04L 45/745 370/392 |
| 2015/0142747 A1* | 5/2015 | Zou | G06F 11/1464 707/649 |
| 2015/0200847 A1 | 7/2015 | Gourlay et al. | |
| 2015/0244617 A1 | 8/2015 | Nakil et al. | |
| 2016/0105317 A1* | 4/2016 | Zimmermann | G06F 9/4445 709/221 |
| 2016/0127472 A1* | 5/2016 | Kano | H04L 49/552 709/223 |

\* cited by examiner

METHOD AND SYSTEM FOR VIRTUAL MACHINE AWARE POLICY MANAGEMENT

CROSS-REFERENCE TO RELATED APPLICATIONS

This application claims benefit under 35 U.S.C. § 119(e) to U.S. Provisional Patent Application Ser. No. 61/925,910, filed on Jan. 10, 2014 and entitled, "METHODS AND SYSTEMS FOR NETWORK VIRTUALIZATION." U.S. Provisional Patent Application Ser. No. 61/925,910 is incorporated herein by reference in its entirety.

BACKGROUND

Computing device resources are increasingly used by virtual machines executing in a hypervisor or an operating system that is, in turn, managing, at least in part, the resources of the computing device. Network devices (e.g., switches) that provide network access to a computing device must be configured to recognize a virtual machine if they are to successfully apply network policies to network traffic originating from or destined for the virtual machine. Changes in the configuration of a virtual machine sometimes occur. Also, virtual machines sometimes migrate from one computing device to another. The new computing device to which a virtual machine has migrated may access the network through a different network device than the computing device from which the virtual machine originated. Changes in configuration of a virtual machine or the migration of a virtual machine may lead to a failure in appropriate network policy application by a network device for a virtual machine.

SUMMARY

In general, in one aspect, the invention relates to a method for maintaining persistent network policies for a virtual machine (VM) that includes determining a name of the VM that is executing on a first host connected to a first network device; binding the name of the VM to a network policy for the VM on the first network device; acquiring from VM management software, using the name of the VM, a universally unique identifier (UUID) of the VM; associating the UUID to the network policy on the first network device; applying the network policy for the VM on the first network device; subscribing to receive notifications from the VM management software of changes to the configuration of the VM corresponding to the UUID; receiving notification from the VM management software of a configuration change made to the VM corresponding to the UUID; and updating the network policy of the VM to reflect the configuration change of the VM.

In general, in one aspect, the invention relates to a system for maintaining persistent network policies for a virtual machine (VM) that includes a first network device that includes a network policy; a VM that includes a name and a universally unique identifier (UUID) and is executing on a first host that is operatively connected to the first network device; VM management software executing on a computing device that is operatively connected to the first network device and operatively connected to the first host. The first network device includes functionality to determine a name of the VM; bind the name of the VM to the network policy for the VM on the first network device; acquire from VM management software, using the name of the VM, the UUID of the VM; associate the UUID to the network policy on the first network device; apply the network policy for the VM on the first network device; subscribe to receive notifications from the VM management software of changes to the configuration of the VM corresponding to the UUID; receive notification from the VM management software of a configuration change made to the VM corresponding to the UUID; and update the network policy of the VM to reflect the configuration change of the VM.

In general, in one aspect, the invention relates to a non-transitory computer readable medium that includes instructions, which, when executed by a processor, perform a method for maintaining persistent network policies for a virtual machine (VM). The method includes determining a name of the VM, which is executing on a first host connected to a first network device; binding the name of the VM to a network policy for the VM on the first network device; acquiring from VM management software, using the name of the VM, a universally unique identifier (UUID) of the VM; associating the UUID to the network policy on the first network device; applying the network policy for the VM on the first network device; subscribing to receive notifications from the VM management software of changes to the configuration of the VM corresponding to the UUID; receiving notification from the VM management software of a configuration change made to the VM corresponding to the UUID; and updating the network policy of the VM to reflect the configuration change of the VM.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to the use of a universally unique identifier (UUID) of a virtual machine (VM) for applying, by a network device, one or more network policies (e.g., network access policies, access control lists, etc) to packets destined for or originating from a VM. More specifically, in one or more embodiments of the invention, one or more network policies are associated with a UUID that identifies a VM. When a packet arrives at an interface of a network device, the packet may be examined, and identifying information contained therein may be used to lookup the UUID and associated network policies assigned to the VM. The UUID is generally persistent (i.e., not often changed). In one or more embodiments of the invention, when changes are made to the configuration of a VM, or the VM is migrated to a different computing device, VM management software informs network devices subscribed to receive such information, and therefore changes made to VM configuration or to the computing device on which a VM is executing may have a reduced impact on network policy application for the VM.

Figure 1:
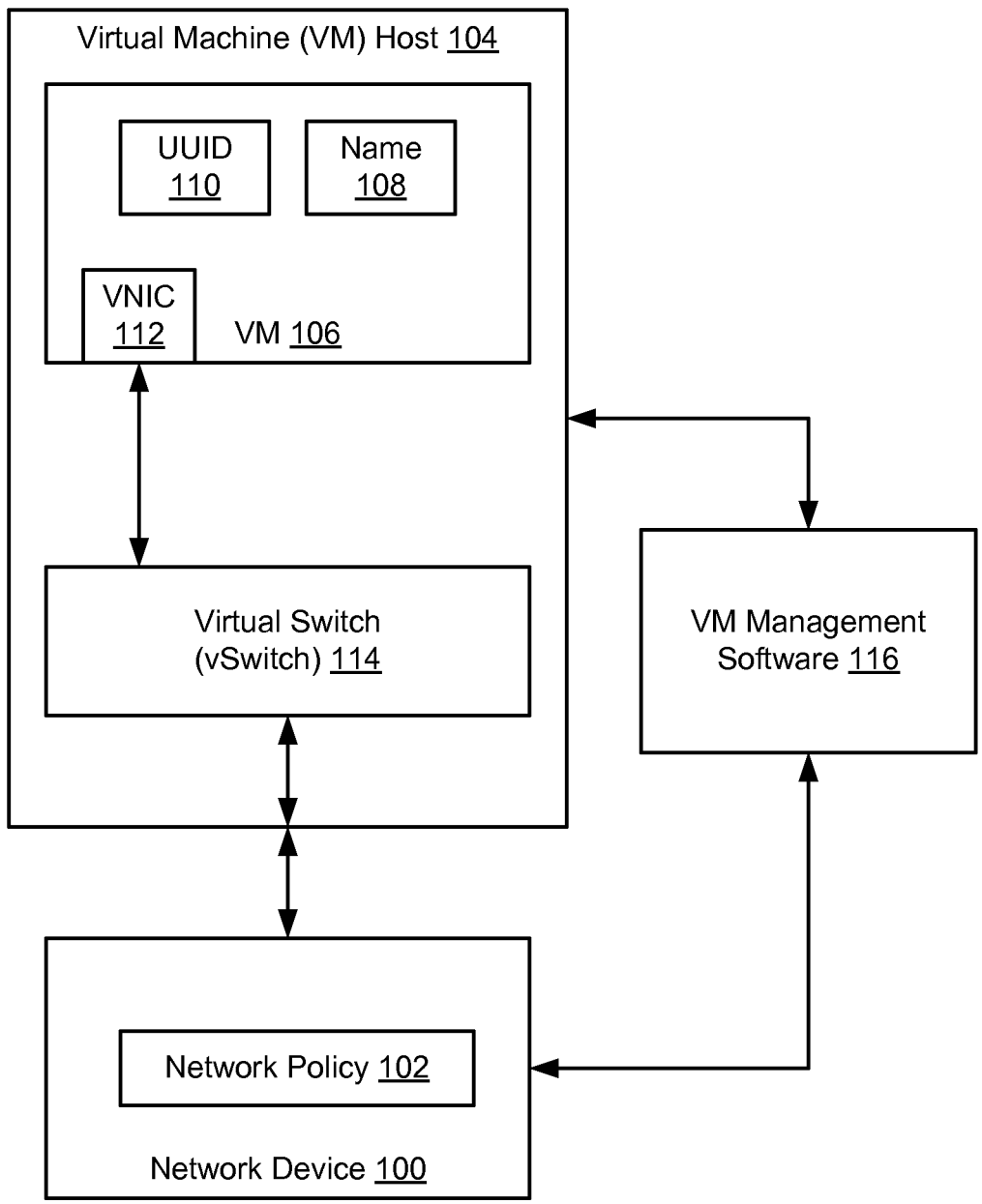
FIG. 1 shows a system in accordance with one or more embodiments of the invention.

FIG. 1 shows a system in accordance with one or more embodiments of the invention. In one or more embodiments of the invention, the system includes a network device (100). The network device may include a network policy (102). In one or more embodiments of the invention, the system includes a virtual machine (VM) host (104). The VM host may include a virtual switch (vSwitch) (114) and a VM (106). The VM may include a virtual network interface card (VNIC) (112), have a name (108), and have a universally unique identifier (UUID) (110). In one or more embodiments of the invention, the VM host is operatively connected to the network device (100). In one or more embodiments of the invention, both the VM host and the network device are operatively connected to VM management software (116). Each of these components is described below.

In one or more embodiments of the invention, a network device (e.g., network device (100)) is a device connected to a computer network (not shown). A computer network may include a datacenter network, a wide area network, a local area network, cellular phone network, or any other suitable network that facilitates the exchange of information from one part of the network to another. In one or more embodiments, the computer network is coupled or overlaps with the Internet.

In one or more embodiments of the invention, the network device (100) is a switch and/or a router. A switch is a physical device that includes persistent storage, memory (e.g., Random Access Memory), one or more processors, and two or more physical ports (i.e., interfaces). Each port may or may not be connected to another device on a network (e.g., a server, a switch, a router, etc.). A switch may be configured to receive packets via the ports and determine whether to (i) drop the packet, (ii) process the packet in accordance with one or more embodiments of the invention (e.g., in accordance with the one or more network policies associated with a VM), and/or (iii) send the packet, based on the processing, out another port on the switch. How the switch makes the determination of whether to drop the packet or send the packet to another device on the network depends, in part, on whether the switch is a layer-2 (L2) switch or a layer-3 (L3) switch (also referred to as a multi-layer switch), which performs at least some functions of a router. If the switch is operating as a L2 switch, the switch uses the destination Media Access Control (MAC) address along with a forwarding table to determine out of which port to send the packet, and includes the ability to write the MAC address of the next device to receive the packet in place of its own MAC address (which was written the last device to send the packet) in the L2 information encapsulating the packet. If the switch is operating as a L3 switch, the switch uses the destination IP address along with a routing table to determine out of which port to send the packet. If the switch is a multi-layer switch, the multi-layer switch includes functionality to process packets using both MAC addresses and IP addresses. In one or more embodiments of the invention, the network device is a virtual switch (vSwitch) or distributed vSwitch (dvSwitch).

In one or more embodiments of the invention, a network device (100) is configured to make a determination about whether to drop the packet, process the packet, and/or send the packet to another device on the network by applying a network policy (e.g., network policy (102)). In one or more embodiments of the invention, the network device (100) includes one or more network policies. A network policy is a set of rules or conditions, implemented by the network device hardware and/or software, that allow a network device to determine how to process a packet received at an interface of the network device, or what to do with a packet that is to be sent from an interface of the network device. For example, a packet may be dropped, transmitted out of an interface of the network device, broadcast or multicast to devices on a network, transmitted to a quarantine for analysis, replicated, etc.

In one or more embodiments of the invention, a network policy includes, in addition to rules/conditions, information corresponding to the source and/or destination (e.g., source MAC address, destination MAC address, source IP address, destination MAC address) of a packet, which is associated with the rules/conditions of the network policy. In one or more embodiments of the invention, the source and/or destination information is associated with the UUID of the computing device to which the source and/or destination information corresponds. In one or more embodiments of the invention, the rules and/or conditions of a network policy are associated directly with the UUID of a VM. In one or more embodiments of the invention, other types of information are associated with the UUID of a VM and/or a network policy, including, but not limited to virtual local area network information (VLAN), transmission protocol type, transmission protocol port number, or any other information that may be included in a packet. An example of a network policy is an access control list (ACL).

An ACL is a set of one or more rules assigned to one or more entities (e.g., computing devices, switches, routers, etc.) connected to a network. Rules of an ACL may apply to inbound packets, outbound packets, or a combination thereof. In one or more embodiments of the invention, identifying information (e.g., MAC address, IP address) included in a packet may be associated in the ACL with the UUID of the VM. Other examples of network policies include, but are not limited to, policies that ensure a desired quality of network service provided for a given entity connected to a network (i.e., a quality-of-service (QoS) policy), and policies that "shape" packet traffic by, for example, delaying transmission of a portion of the packets to ensure that the bandwidth through an interface of the network device does not exceed a defined threshold.

In one or more embodiments of the invention, the network device (100) that includes the network policy (102) is operatively connected to a VM host (104). In one or more embodiments of the invention, the VM host (104) is a computing device configured to provide computing resources for use by one or more VMs (e.g., VM (106)). As used in this document, the term "computing device" refers to a physical system capable of electronically processing instructions. A computing device may be a server, blade in a blade-server chassis, a desktop computer, a mobile device (e.g., laptop computer, smart phone, personal digital assistant, tablet computer, or other mobile device), and/or any other type of computing device or devices that includes at least the minimum processing power, memory, input and output device(s), VM hosting ability, and network connectivity to perform, at least in part, one or more embodiments of the invention.

The VM host may include one or more computer processor(s) (not shown), associated memory (not shown) (e.g., random access memory (RAM), cache memory, flash memory, etc.), one or more storage device(s) (not shown) (e.g., a hard disk, a flash memory storage, etc.), and numerous other elements and functionalities. The computer processor(s) of the VM host (104) may be an integrated circuit for processing instructions. For example, the computer processor(s) of the VM host (104) may be one or more cores, or micro-cores of a processor. Instructions may be processed by the one or more processors included in VM host (104). Software instructions in the form of computer readable program code to perform embodiments of the invention, or a portion thereof, may be stored, in whole or in part, temporarily or permanently, on a non-transitory computer readable medium such as a storage device, flash memory, physical memory, or any other computer readable storage medium of the VM host (104). Specifically, the software instructions may correspond to computer readable program code that when executed by a processor(s), is configured to perform embodiments of the invention, or a portion thereof.

In one or more embodiments of the invention, the VM host (104) is a server. A server may include any type of system (e.g., software and computer hardware) that is configured to generate, send, receive, and/or process requests and replies either locally or over a network using software and computer hardware. The server may include one or more processors, memory, and one or more physical network interfaces. Examples of types of servers include, but are not limited to, virtualized servers (e.g., VM host (104)), database servers, dynamic host configuration protocol (DHCP) servers, application servers, file servers, print servers, and mail servers.

In one or more embodiments of the invention, the VM host (104) includes functionality to host one or more VMs (e.g., VM 1(06)). Hosting a VM includes providing a VM with resources of a computing device that have been allocated for use by the VM and scheduling time and/or space of the resources of the computing device to execute instructions generated by the VM. The VM host may also include functionality to translate instructions generated by a VM (e.g., VM (106)) into instructions that can be understood by the operating system, hypervisor, and/or underlying hardware of the VM host. In one or more embodiments of the invention, the VM host includes a hypervisor (not shown). A hypervisor (i.e., virtual machine monitor) is computer software that includes the ability to create, execute, and, at least in part, manage VMs executing on a computing device. In other embodiments of the invention, the VM host includes an operating system (e.g., a Linux-based or Windows-based operating system) on which a VM executes.

In one or more embodiments of the invention, the VM host (104) includes a vSwitch (114). A vSwitch is a software construct that implements switch functionality, similar to the switch functionality described above, that is implemented virtually by a hypervisor and/or operating system executing on a computing device (e.g., VM host (104)) and that provides networking capabilities to one or more VMs (e.g., VM (106)). A vSwitch may exist within a hypervisor of a single VM host, or may be a distributed vSwitch that is implemented by the hypervisor of more than one VM host. A VM host may include more than one vSwitch to provide network access to hosted VMs. In one or more embodiments of the invention, in addition to downlinks to one or more VMs of a VM host, the vSwitch may include one or more uplinks to one or more network devices (e.g., network device (100)) via a network interface card (not shown) of the VM host. In one or more embodiments of the invention, the vSwitch includes functionality to implement network policies for received or sent packets.

In one or more embodiments of the invention, the VM host (104) hosts at least one VM (106). A VM is a software emulation of a computing device. One type of VM is one in which an operating system and applications may execute. In one or more embodiments of the invention, the hypervisor of the VM host (104) creates a layer of abstraction between an executing VM (e.g., VM (106)) and the underlying computing resources of the VM host. The layer of abstraction allows, for example, more than one operating systems of more than one VM to execute on the VM host in isolation from one another in regards to instruction execution. VMs of a VM host may be in communication with one another via a vSwitch (114). A VM may be connected to a network outside the VM host via the physical network interface card (NIC) (not shown) of the VM host and therefore have the ability to send packets out of the host and receive packets from outside the host through a network device (100) operatively connected to the physical NIC of the VM host (104).

In one or more embodiments of the invention, the VM includes a virtual network interface card (VNIC) (112). A VNIC is a software implementation of a NIC that exists within a VM (106). A VNIC, similar to a physical NIC, may include (e.g., be assigned) a MAC address and/or an IP address. A VM may include one or more VNICs. In one or more embodiments of the invention, the configured or assigned attributes of a VNIC (e.g., IP address, MAC address, etc.) may change. In example, in a network with a DHCP server, which issues IP addresses to interfaces (physical or virtual) connected to the network, a loss of network connectivity to a VM may result, after the VM is reconnected to the network, in the DHCP server issuing the VNIC of the VM a different IP address than the VNIC had before the disconnection. For another example, an administrator of a virtualized datacenter may devise a new MAC address scheme by which to identify VMs while monitoring network traffic and thus change the MAC addresses of the VMs in the datacenter to conform to the desired scheme.

In one or more embodiments of the invention, the VM (106) includes a name (108). A name of a VM may be a string of characters (e.g., letters, numbers, symbols, etc.) that are used to identify a virtual machine. The name may be automatically generated when a VM is created, may be chosen or selected when the VM is created, and may be changed anytime after the VM is created. For example, a VM on a VM host in a datacenter may be created by an administrator who chooses the name "Engineering-VM-1" initially, and who later changes the name, as the number of VMs in the datacenter increases, to "Engineering-SF-VM-0001".

In one or more embodiments of the invention, the VM (106) includes a UUID (110). A UUID is an identifier of the VM that distinguishes the VM uniquely from other VMs. A UUID may be based on a unique identifier of the underlying computing device of the VM (e.g., VM host 104) and the path to the VMs configuration file(s) in a file system. A UUID may be rarely changed or modified for the life of a VM. A UUID may be any length and any combination of characters that allows a VM to be uniquely identified. For example, a UUID may be a 128-bit integer represented in hexadecimal notation such as:

27 9a 8b 7c 6d 5e 6f ee-4f 3e 2d 1c0a ce72 e5

In one or more embodiments of the invention, both the network device (100) and the VM host (104) are operatively connected to VM management software (116). VM management software may be software executing on a computing device (e.g., a server) that manages various aspects of one or more virtualized servers (e.g., VM host (104)) as well as, at least in part, the VMs (e.g., VM (106)) hosted on the virtualized server(s). In one or more embodiments of the invention, the VM management software tracks the location of VMs and information related to VMs including, but not limited to UUID, name, IP addresses of VNICs, MAC addresses of VNICs, and how many VNICs a VM has. Other examples of information managed by VM management software include, but are not limited to, computing resources allocated for a VM, computing resources (total and/or in-use) of one or more VM hosts, statistical data related to the performance of VM hosts and VMs, configuration details for vSwitches and distributed vSwitches on one or more VM hosts, information related to the storage present in or attached to one or more VM hosts and/or VMs, and information about physical or virtual storage adapters and/or converged network adapters.

In one or more embodiments of the invention, VM management software includes functionality to accept subscription requests from entities (e.g., network device (100)) that want to receive publication (i.e., notification) of any changes (e.g., configuration changes) to, updates of, or migration of VMs on VM hosts managed by the VM management software. For example, a network device may subscribe to receive notification of any configuration change made to a VM with a certain UUID, thus when a virtualization administrator changes the MAC address of a VM with the certain UUID, the VM management software publishes the change and sends the publication to the subscribed network device, which may in turn use the information to update its network policies corresponding to the VM. Network device response to changes in VM configuration are discussed in more detail in the discussion of FIGS. 2 and 3 below.

The invention is not limited to the system configuration shown in FIG. 1.

Figure 2:
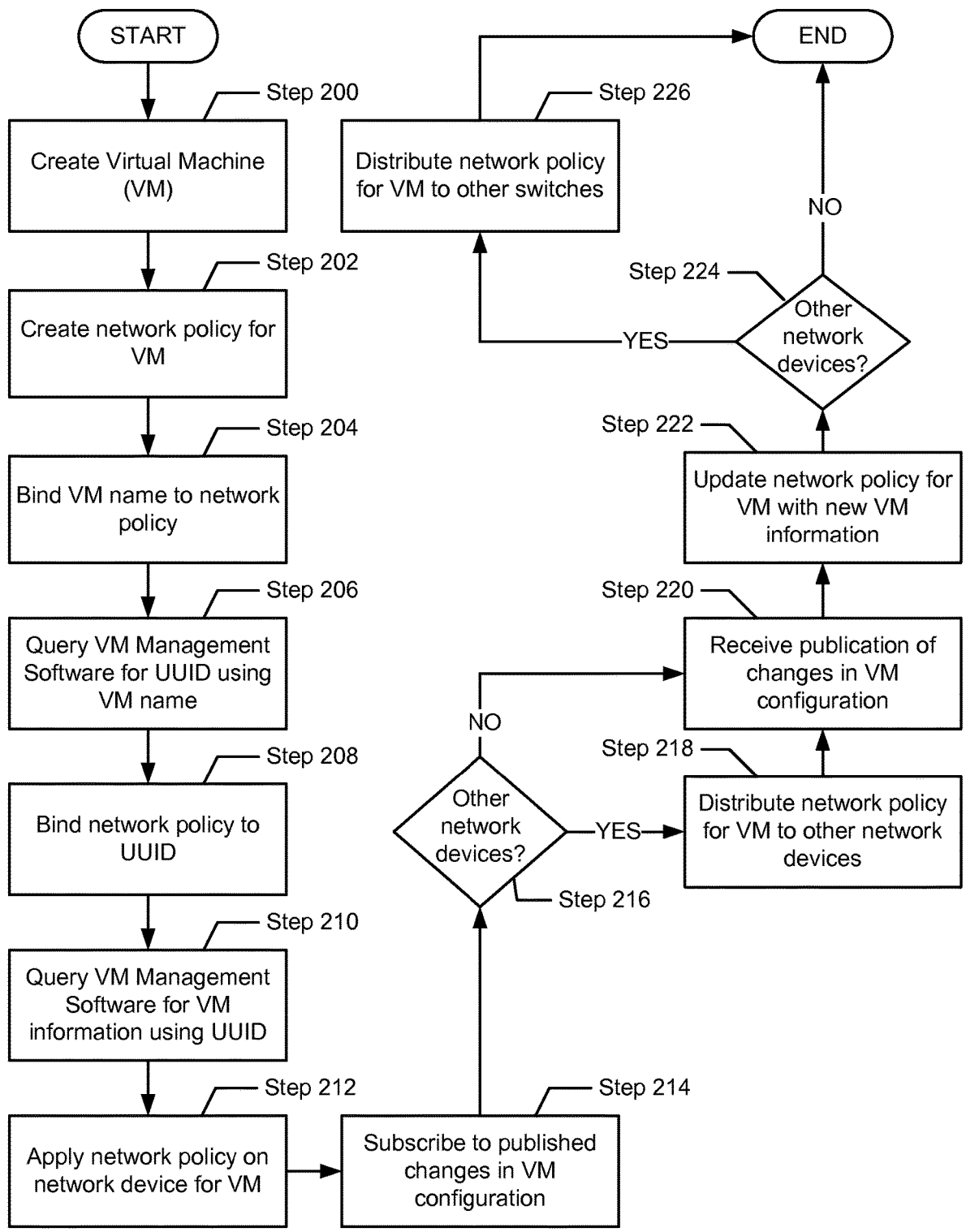
FIG. 2 shows a method for maintaining consistent application of one or more network policies for a VM by a network device after VM configuration information changes in accordance with one or more embodiments of the invention.
Figure 3:
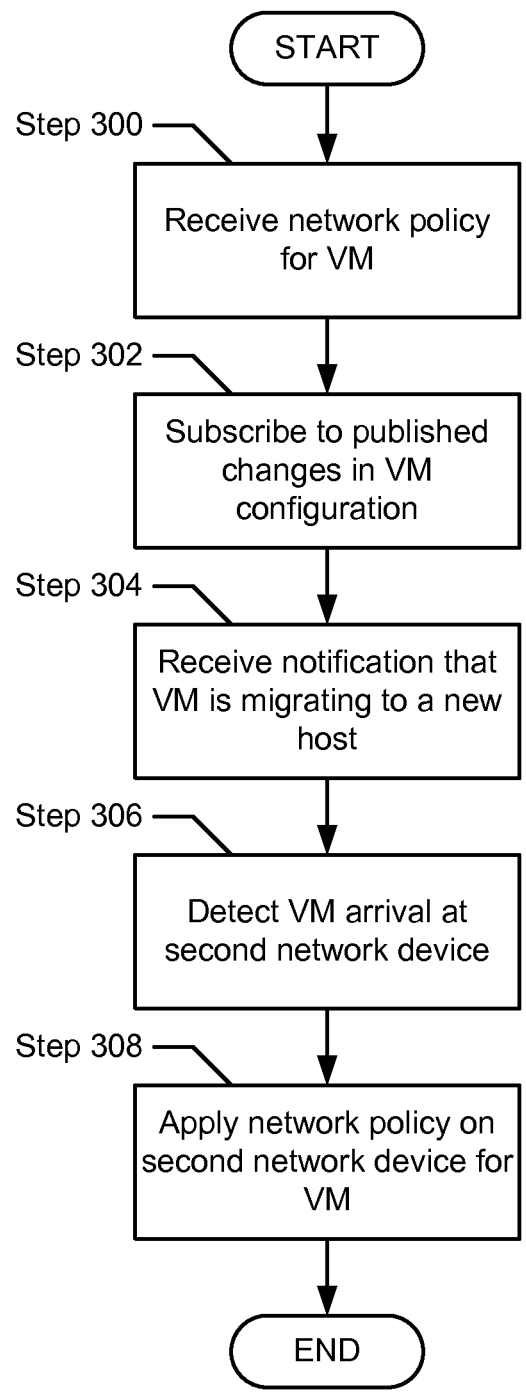
FIG. 3 shows a method for maintaining consistent application of one or more network policies for a VM after a migration of the VM in accordance with one or more embodiments of the invention.

FIGS. 2 and 3 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 2 and 3 may be performed in parallel with any other steps shown in FIGS. 2 and 3 without departing from the invention.

Turning to FIG. 2, FIG. 2 shows a method for maintaining consistent application of one or more network policies for a VM by a network device after VM configuration information changes in accordance with one or more embodiments of the invention.

In Step 200, a VM is created. In one or more embodiments of the invention, creation of a VM includes, but is not limited to, choosing a VM host on which to create the VM, choosing or allowing automatic generation of a name for the VM, choosing or allowing automatic creation of a UUID for the VM, defining the network configuration (e.g., number of VNICs, IP addresses, MAC addresses, etc) of a VM, and allocation computing resources of a VM host for use by a VM. VM creation may be performed using VM management software that is managing a VM host.

In Step 202, at least one network policy is created for the VM on a network device that is operatively connected to the VM. Creation of a network policy may include defining one or more rules that will be evaluated and applied to packets destined for or originating from a VM. In one or more embodiments of the invention, the one or more network policies are stored and/or implemented in the software of the network device, the hardware of a network device, or a combination thereof. For example, an ACL may be created for use with a VM. In one or more embodiments of the invention, a network policy is created that is to be applied to all VMs executing on VM hosts operatively connected to a network device. In other embodiments of the invention, different network policies are created for different VMs or sets of VMs according to the requirements of the virtualized environment in which the VM exists.

In Step 204, the name of a VM is associated with one or more network policies of a network device. Associating the name of a VM with a network policy may include adding the name of the VM to the network policy entry stored in the software and/or hardware of the network device. For example, a traffic shaping policy created on a network device for a VM may be associated with the name of the VM.

In Step 206, the network device queries the VM management software for the UUID of a VM. In one or more embodiments of the invention, querying the VM management software includes using the name of the VM to identify to the VM management software for which VM the network device is requesting the UUID. In one or more embodiments of the invention, querying the VM management software includes using an application programming interface provided by the distributor of the VM management software to request the information. In one or more embodiments of the invention, the VM management software responds to the request by providing to the network device the UUID corresponding to the name of the VM provided by the network device.

In Step 208, the network device binds one or more network policies to the UUID of the VM. In one or more embodiments of the invention, the network device binds each network policy that was associated with the VM name in Step 204 with the UUID of the VM obtained in Step 206. Binding a network policy to a UUID may include creating an association between the UUID and the network policy. For example, the network device may include a table of entries, where an entry includes the UUID and the network policy (or a reference to the network policy).

In Step 210, the network device queries the VM management software for information related to the VM using the UUID. In one or more embodiments of the invention, the UUID is used to request from the VM management software VM information that includes, but is not limited to, number of VNICs, IP addresses for each VNIC, MAC addresses for each VNIC, configured maximum transmission unit size, vSwitches to which the VM is connected, VLAN or virtual extensible local area network (VXLAN) information related to the VM, and information related to the physical NICs attached to vSwitches or distributed vSwitches to which the VM is connected (including the IP addresses and MAC addresses of the physical NICs). In one or more embodiments of the invention, information obtained from the VM management software corresponding to a VM may be associated on the network device with the UUID of the VM and therefore to the associated one or more network policies bound to the UUID of the VM.

In Step 212, one or more network policies that have been associated with the UUID of a VM are applied on a network device for the VM. Application of a network policy may include preparing the network device to evaluate the one or more network policies associated with a VM in the event that a packet arrives at an interface of the network device that either originates from or is destined for a VM, in order to determine how to process the packet. Preparing the network device to evaluate network policies may include configuring the network device to have the capability of examining a packet to determine if the packet includes any of the information related to the VM (or a portion thereof) that was obtained from the VM management software using the UUID of the VM in Step 210. For example, if an ACL is the network policy associated with the UUID of a VM, the ACL may include entries that allow or deny traffic based on the information (e.g., IP address, MAC, etc). Continuing the example, the network device may be configured to examine incoming packets and/or outgoing packets, determine the MAC addresses or IP addresses present in the packet, determine which UUID corresponds to that MAC address or IP address, determine which ACL is associated with that UUID, and evaluating the rules of the ACL to determine how to process the packet (e.g., allow the packet to pass, drop the packet, etc.). In one or more embodiments of the invention, application of a network policy includes implementing at least a portion of a network policy stored in the network device in the hardware of the network device.

In Step 214, the network device subscribes to receive published changes to the configuration of a VM. In one or more embodiments of the invention, subscribing to receive changes to the VM configuration includes sending a subscription request to the VM management software to receive publication/notification of configuration changes made to the VM corresponding to the UUID obtained from the VM management software obtained in Step 210. Changes to the configuration of a VM may include whether or not the VM has migrated from one VM host to another VM host. In other embodiments, the network device is configured to periodically re-query the VM management software for information corresponding to a VM, evaluate the information received as a response to determine if any information has changed, and, in the event changes have been made, updating the information on the network device. In still other embodiments of the invention, the VM management software includes functionality to periodically send out VM information to network devices, which may use the information to update the VM information on the network device in the event a configuration change has been made.

In Step 216, a determination is made if there are any other network devices connected to the network. In one or more embodiments of the invention, relevant network devices include network devices that are connected to at least one VM host managed by the VM management software and to which one or more VMs may be migrated. In one or more embodiments of the invention, each network device in a network includes functionality to share its presence the other network devices attached to the network, as well as store information shared from the other network devices. In one or more embodiments of the invention, network devices attached to the network maintain a list of other network devices attached to the network to which VM hosts are also attached. In such embodiments of the invention, the list may be updated periodically or aperiodically and the information populating the list may be received automatically or as the result of a request generated asking for the information.

Continuing with Step 216, if there are other network devices attached to a network, the process proceeds to Step 218. Otherwise, if there are no other relevant network devices, the process proceeds to Step 220.

Turing to Step 218, after determining that there are other network devices attached to a network, the network policy created on the first network device for a VM (through which the VM is configured to access the network) is distributed to the other network devices. Distribution may include multicasting the network policy associated with a VM to the network devices attached to the network that provide network access to VM hosts (i.e., virtualized servers). In one or more embodiments of the invention, when one of the other network devices receives a network policy associated with a VM, the other network device stores the policy until, and if, the VM is migrated to a VM host connected to the other network device, at which point the network policy is implemented. In other embodiments of the invention, the network policy is implemented in the other network devices upon receipt of the network policy by the other network device.

In Step 220, network devices that subscribed to receive changes to configuration information related to a VM of a given UUID (e.g., in Step 210, above) receive notification that the VM configuration has changed. In one or more embodiments of the invention, VM management software is configured to distribute configuration change information related to a VM of a given UUID to all subscribers that subscribed to receive notification of such configuration changes. In one or more embodiments of the invention, the network device attached to a VM host that hosts a VM with a given UUID receives notification of a configuration change made to the VM. In other embodiments of the invention, network devices to which a network policy for a VM has been distributed (e.g., as in Step 218) subscribe to and receive notification of configuration changes made to the VM. Examples of changes that are made to a VM that a network device may subscribe to receive notification of include, but are not limited to, changes to IP address of one or more VNICs, changes to the MAC address of one or more VNICs, changes to the VLAN associated with a VM, and changes to VXLAN configuration associated with a VM.

In Step 222, one or more network policies associated with a VM are updated with new configuration information related to the VM. In one or more embodiments of the invention, updating one or more network policies includes finding the one or more network policies associated with the UUID of a VM that exist in the network device and modifying the information relating to the VM to align with the new information corresponding to the VM received in Step 220. In one or more embodiments of the invention, updated information relating to a VM is associated, by a network device, with the UUID of the VM. For example, if a virtualization administrator changes the static IP address of a VNIC of the VM, the VM management software notifies the subscribed network device, and the network device associates the updated IP address with the UUID of the VM, finds all network policies associated with the VM, and updates appropriate IP address fields to reflect the new IP address.

In Step 224, a network device that has made an update to one or more network policies associated with a VM determines if there are other network devices connected to the network, similar to Step 216, and, if appropriate, distributes the updated network policies to the other network devices. If there are no other network devices to which to distribute the one or more network policies, the process may end. If there are other network devices, the process proceeds to Step 226.

In Step 226, the updated policies are, as described above in Step 218, distributed to the one or more other network devices determined to exist in Step 224. After distribution of the updated network policies, the process may end.

Turning to FIG. 3, FIG. 3 shows a method for maintaining consistent application of one or more network policies for a VM during and/or after a migration of the VM in accordance with one or more embodiments of the invention.

In Step 300, a network device receives one or more network policies for a VM. For example, network policies may be received from a network administrator defining the one or more network policies on the network device. In one or more embodiments of the invention, one or more network policies for a VM may be received via distribution of the one or more network policies from one or more other network devices connected to the network, as discussed above in the description of Step 218 in FIG. 2.

In Step 302, a network device subscribes to receive notification of changes to configuration of a VM. In one or more embodiments of the invention, the network device subscribes to receive changes after receiving the one or more network polices corresponding to a UUID of a VM from a network administrator or from another network device. In one or more embodiments of the invention, the network device subscribes to receive notification of configuration changes to a VM using the UUID of the VM.

In Step 304, the network device receives notification (i.e., a publication) that the VM is migrating to a new host. In one or more embodiments of the invention, the network device is configured to, upon receiving notification that a VM of a VM host to which the network device is attached is migrating to a new VM host, perform a check that the new VM host to which the VM is migrating is connected to the network via a second network device to which one or more network polices corresponding to the VM have been distributed. If the new network device is not a device that has received the one or more network policies corresponding to the VM, the network device may be configured to distribute the one or more network policies to the second network device. In embodiments of the invention in which the second network device has received one or more network polices corresponding to a VM before the VM is migrated, and in which the second network device has subscribed to receive notifications corresponding to the VM, the second network device receives notification of the VM migration from the VM management software.

In Step 306, the arrival of a VM at a new VM host is detected by the second network device. In one or more embodiments of the invention, detection occurs when the second network device receives notification of the migration from the VM management software. In other embodiments of the invention, the second network device is not aware of the migration until the VM sends a packet that is to travel through the network device, or a packet destined for the VM arrives at the network device. In such embodiments, the second network device detects that the VM is now executing on a VM host to which the second network device is attached by discovering, in a packet sent to and/or from the VM, information (e.g., IP address, MAC address, etc.) that corresponds to the UUID of the VM, and for which the second network device has at least one network policy in the software and/or hardware of the network device.

In Step 308, the second network device applies the one or more network policies corresponding to the VM. In one or more embodiments of the invention, application of the one or more network policies is substantially similar to the application of one or more network policies discussed in the description of Step 212 of FIG. 2, above.

Figure 4A:
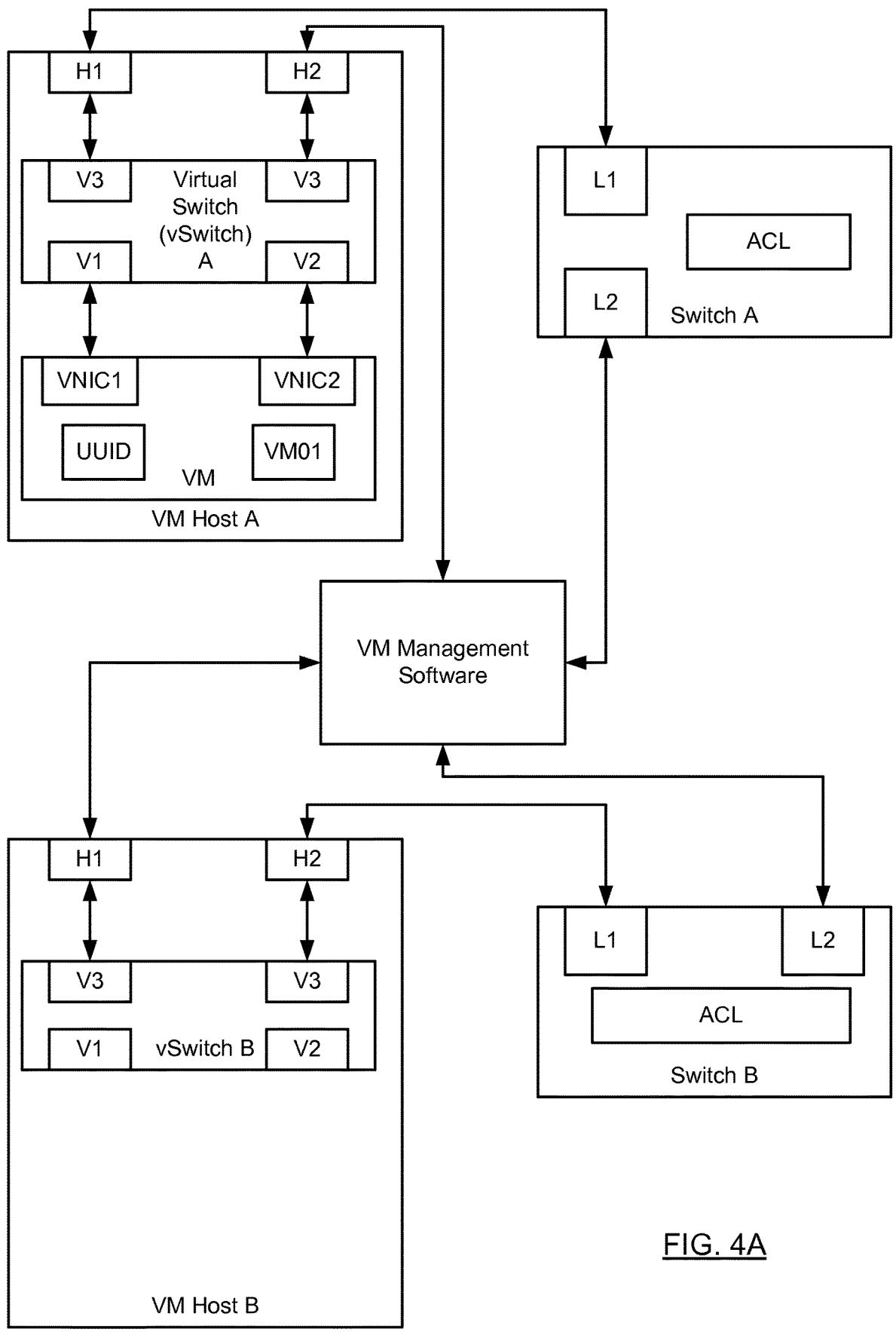
FIGS. 4A, 4B, and 4C show an example in accordance with one or more embodiments of the invention.

FIG. 4A shows an example in accordance with one or more embodiments of the invention. The example is not intended to limit the scope of the invention.

Referring to FIG. 4A, consider a scenario in which a virtualization environment includes two switches, two VM hosts, and a server on which VM management software is executing. VM host A includes a VM with a UUID, a name (VM01), and two VNICs, each of which has an IP address and a MAC address. The VNICs (VNIC1 and VNIC2) of the VM of VM host A are associated with separate virtual ports of virtual switch (vSwitch) A (e.g., virtual ports V1 and V2 of vSwitch A). The vSwitch A of VM host A has two uplinks, V3 and V4, which are associated with separate physical NIC ports of VM host A (e.g., H1 and H2 of VM host A). Physical NIC port H1 of VM host A is operatively connected to port L1 of Switch A. Physical NIC port H2 is operatively connected to the server on which the VM management software is executing. Switch A includes an ACL associated with the UUID of the VM. Switch A is operatively connected to the server on which the VM management software is executing. Switch A has previously subscribed to receive notification of changes to the configuration of the VM from the VM management software using the UUID of the VM. Switch A has also previously distributed the ACL to Switch B. Switch B is also operatively connected to the server on which the VM management software is executing. A second VM host, VM host B, is connected to port L1 of Switch B via physical NIC port H2 and is also operatively connected to the server on which the VM management software is executing. VM host B includes vSwitch B, which has two uplink ports, V3 and V4, which are associated with physical NIC ports H1 and H2, respectively, of VM host B.

Figure 4B:
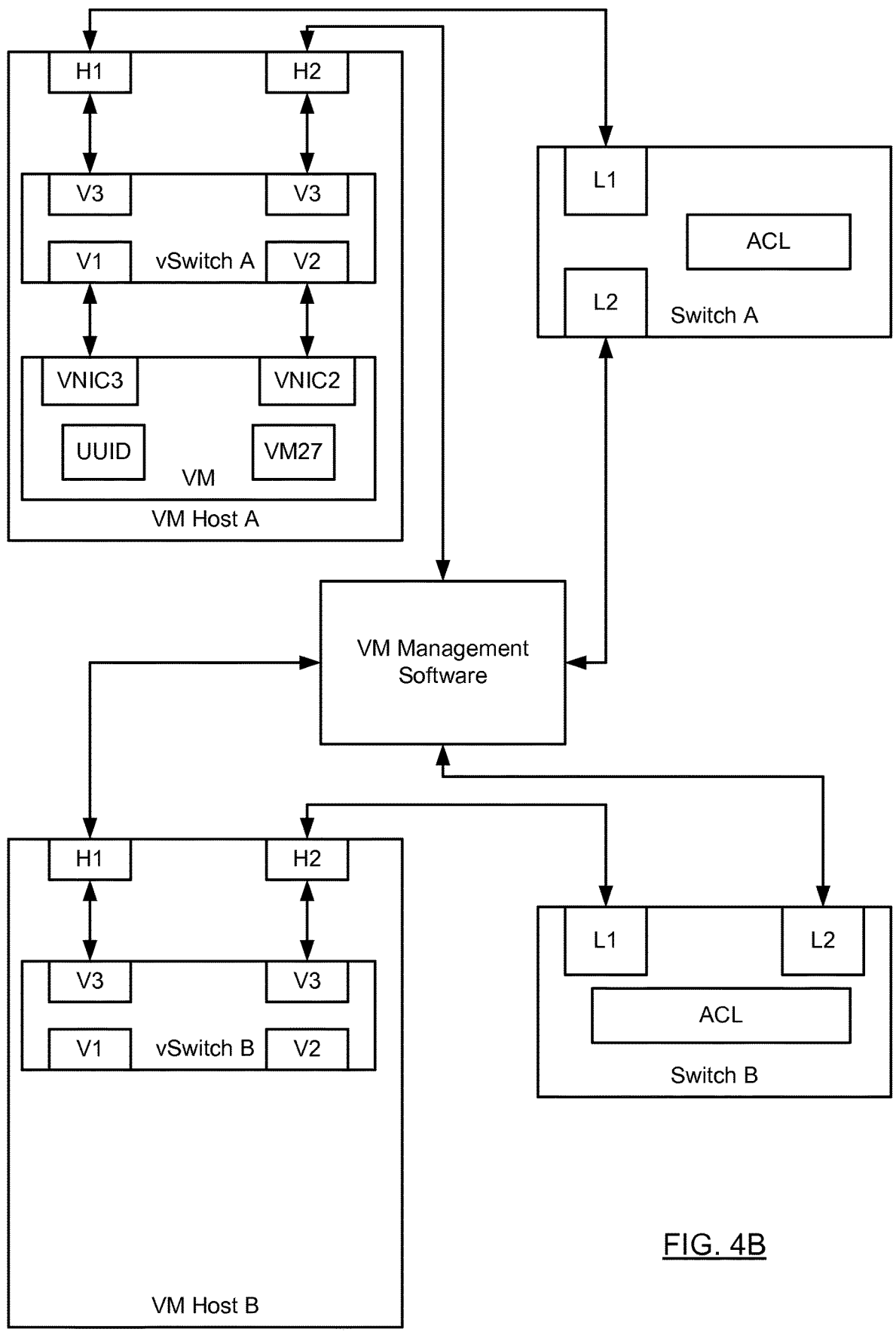

Turning to FIG. 4B, FIG. 4B continues the scenario initially shown in FIG. 4A. However, as shown in FIG. 4B, the VM of VM host A has experienced configuration changes. The VM has been given a new name (VM27) and VNIC1 has been removed and replaced with VNIC3 by the virtualization administrator responsible for managing the virtualization environment that includes VM host A and VM host B. The new VNIC3 includes a MAC address and an IP address that are different from the MAC address and IP address of the removed VNIC1. The VM management software, which, among other tasks, tracks configuration changes made to VMs, detects the name change and VNIC change made to the VM of VM host A and notifies entities that have subscribed to receive notifications of such changes that the VM configuration has changed, as well as what changes have occurred. Switch A has subscribed to receive notification of changes made to the VM, and thus the VM management software notifies Switch A of the new name, new VNIC, new IP address, and new MAC address of the VM. Switch A updates the ACL corresponding to the UUID of the VM with the new configuration information of the VM received from the VM management software, and then re-applies the ACL. Thus, the ACL remains properly applied on Switch A for the VM after the VM configuration information has changed without the need for a manual update to the ACL. After application of the updated ACL, Switch A determines if there are other network devices to which the updated ACL should be distributed. Switch A keeps records of all switches in the virtualization environment connected to a VM host and to which the VM may be migrated. The list includes switch B, and therefore Switch A distributes the updated ACL to Switch B.

Figure 4C:
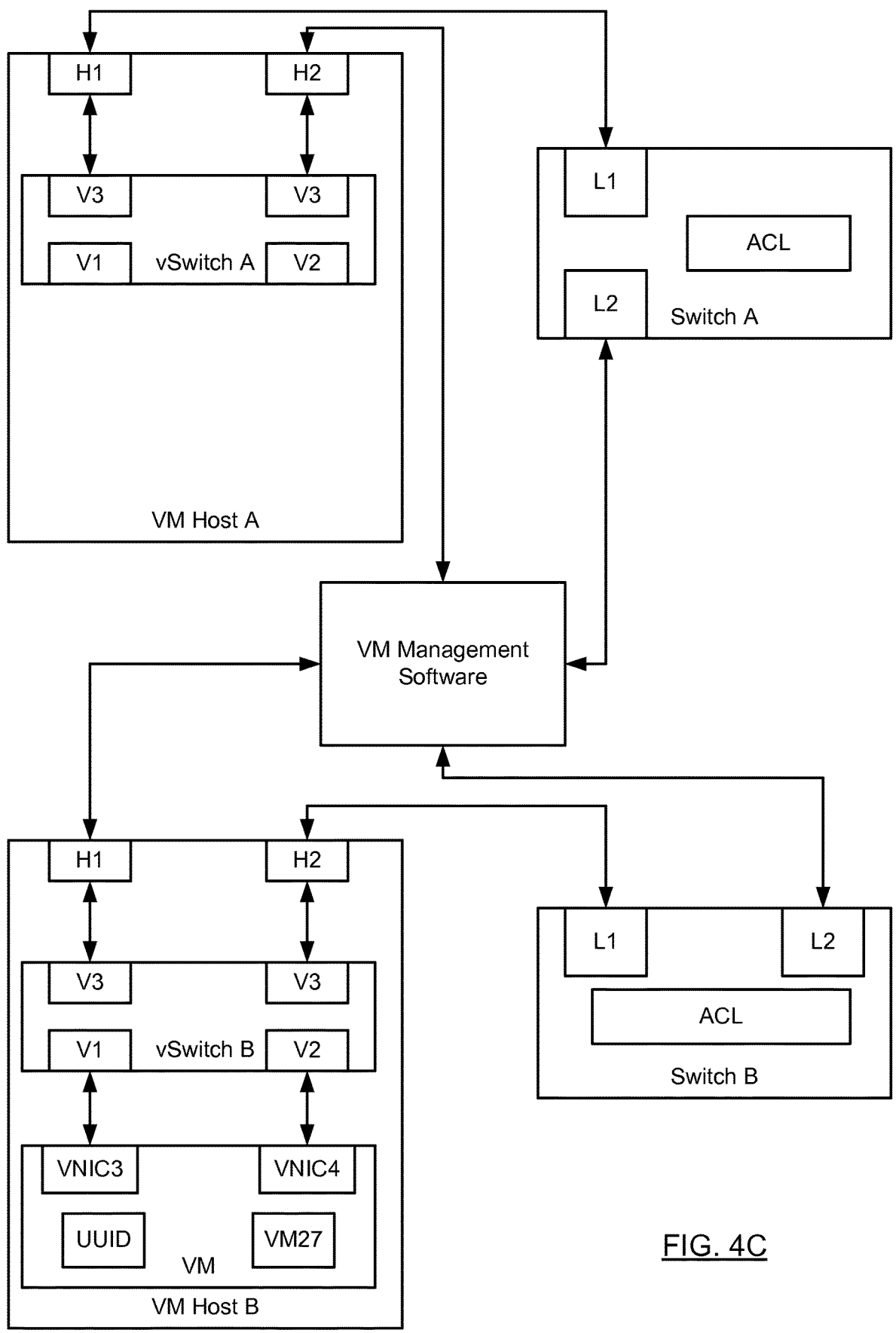

Turning to FIG. 4C, FIG. 4C continues the scenario initially described in the discussion of FIG. 4A and continued in the discussion of FIG. 4B. However, as shown in FIG. 4C, the VM that was executing on VM host A in FIGS. 4A and 4B has been migrated to VM host B. After the migration completes, the VM generates a packet to send to another device on the network. The packet is sent from VNIC3 of the VM to port V1 of vSwitch B of VM host B. When vSwitch B receives the packet from the VM, the packet is transmitted out of vSwitch B port V3 to physical NIC port H2 of VM host B. The packet is then transmitted to port L1 of switch B. When the packet is received at switch B, the packet is examined to check source IP address. The source IP address of the packet is the IP address of VNIC3, which corresponds to the ACL associated on switch B with the UUID of the VM that is now executing on VM host B. Discovery of the source IP address of VNIC3 informs switch B that the VM is now executing on VM host B, which is connected to switch B. Switch B therefore applies the ACL previously received from switch A corresponding to the VM and then evaluates the ACL. The ACL is for inbound traffic from the VM and includes a rule that allows any packet to pass that is a transmission control protocol (TCP) packet, as well as a rule that the VM may only send packets to IP addresses with the first octet of the IP address is "27" (e.g., 27.0.0.1). The packet received from VNIC3 of the VM is a TCP packet destined for IP address 27.72.26.17, therefore switch B determines that the packet should be allowed to pass. Switch B then takes appropriate action to process the packet and send the packet along the journey towards its ultimate destination.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for maintaining persistent network policies for a virtual machine (VM), the method comprising:
   identifying, by a first network device, a name of the VM, wherein the VM is executing on a first host connected to a first network device;
   creating a network policy for the VM on the first network device, wherein the network policy comprises a rule comprising an identifier of the VM and a corresponding action;
   binding, by the first network device and based on the identifying, the name of the VM to the network policy for the VM on the first network device;
   acquiring, by the first network device and from VM management software executing on a computing device, using the name of the VM, a universally unique identifier (UUID) of the VM to obtain an acquired UUID, which uniquely identifies the VM among a first plurality of VMs executing on the first host and a second plurality of VMs executing on other hosts;
   associating the acquired UUID to the network policy on the first network device;
   applying the network policy for the VM on the first network device;
   processing, by the first network device, a plurality of packets received at the first network device using the rule to:
      make a first determination that each packet of the plurality of packets comprises the identifier of the VM; and,
      based on the first determination, make a decision to perform the action on the plurality of packets;
   subscribing, by the first network device and based on the associating of the acquired UUID and the applying of the network policy, to receive notifications from the VM management software of changes to a configuration of the VM corresponding to the acquired UUID;
   receiving notification, by the first network device and from the VM management software, of a configuration change made to the VM corresponding to the acquired UUID;
   updating, by the first network device, the network policy of the VM to reflect the configuration change of the VM;
   making a second determination, by the first network device, that there is a second network device that requires the network policy for the VM; and
   initiating, by the first network device and based on the second determination, a distribution of the network policy to the second network device,
   wherein, after the distribution, the network policy is applied on the second network device.

2. The method of claim 1, further comprising:
   subscribing, by the second network device, after receiving the network policy from the first network device, to receive notifications from the VM management software of changes to the configuration of the VM corresponding to the acquired UUID;
   receiving notification at the second network device from the VM management software that the VM is migrating;
   detecting, by the second network device, that the VM has migrated from the first host to a second host connected to the second network device;
   identifying, using the acquired UUID, the network policy associated with the VM; and
   applying the network policy for the VM on the second network device.

3. The method of claim 1, wherein the network policy comprises an access control list (ACL).

4. The method of claim 1, wherein the network policy comprises a quality of service policy.

5. The method of claim 1, wherein the configuration change is one selected from a group consisting of a name change, a location change, and a networking configuration change.

6. The method of claim 1, wherein applying the network policy comprises implementing the network policy in hardware of the first network device.

7. A system for maintaining persistent network policies for a virtual machine (VM), the system comprising:
   a first network device comprising a processor and a plurality of ports;

the VM comprising a name and a universally unique identifier (UUID), wherein the VM is executing on a first host that is operatively connected to the first network device;

VM management software executing on a computing device that is operatively connected to the first network device and operatively connected to the first host;

wherein the first network device is configured to:
identify the name of the VM;
create a network policy for the VM on the first network device, wherein the network policy comprises a rule comprising an identifier of the VM and a corresponding action
bind, based on the identification of the name of the VM, the name of the VM to the network policy for the VM on the first network device;
acquire from the VM management software executing on a computing device, using the name of the VM, the UUID of the VM to obtain an acquired UUID, which uniquely identifies the VM among a first plurality of VMs executing on the first host and a second plurality of VMs executing on other hosts;
associate the acquired UUID to the network policy on the first network device;
apply the network policy for the VM on the first network device;
process a plurality of packets received at the first network device using the rule to:
make a first determination that each packet of the plurality of packets comprises the identifier of the VM; and,
based on the first determination, make a decision to perform the action on the plurality of packets;
subscribe, based on the association of the acquired UUID and the application of the network policy, to receive notifications from the VM management software of changes to the configuration of the VM corresponding to the acquired UUID;
receive notification from the VM management software of a configuration change made to the VM corresponding to the acquired UUID;
update the network policy of the VM to reflect the configuration change of the VM;
make a second determination that there is a second network device that requires the network policy for the VM; and
initiate, based on the second determination, a distribution the network policy to the second network device,
wherein, after the distribution, the network policy is applied on the second network device.

8. The system of claim 7 wherein the first network device is one selected from a group consisting of a switch and a router.

9. The system of claim 7, wherein the second network device is further configured to:
subscribe, after receiving the network policy from the first network device, to receive notifications from the VM management software of changes to the configuration of the VM corresponding to the acquired UUID;
receive notification at the second network device from the VM management software that the VM is migrating;
detect, by the second network device, that the VM has migrated from the first host to a second host connected to the second network device;
identify, using the acquired UUID, the network policy associated with the VM; and
apply the network policy for the VM on the second network device.

10. The system of claim 7, wherein the network policy comprises an access control list (ACL).

11. The system of claim 7, wherein the network policy is one selected from a group consisting of a firewall policy and a network traffic shaping policy.

12. The system of claim 7, wherein the configuration change is one selected from a group consisting of name change, location change, internet protocol address change, and media access control address change.

13. The system of claim 7, wherein applying the network policy comprises implementing the network policy in software of the first network device.

14. A non-transitory computer readable medium comprising instructions, which when executed by a processor, perform a method for maintaining persistent network policies for a virtual machine (VM), the method comprising:
identifying, by a first network device, a name of the VM, wherein the VM is executing on a first host connected to a first network device;
creating a network policy for the VM on the first network device, wherein the network policy comprises a rule comprising an identifier of the VM and a corresponding action;
binding, by the first network device and based on the identifying, the name of the VM to the network policy for the VM on the first network device;
acquiring, by the first network device and from VM management software executing on a computing device, using the name of the VM, a universally unique identifier (UUID) of the VM to obtain an acquired UUID, which uniquely identifies the VM among a first plurality of VMs executing on the first host and a second plurality of VMs executing on other hosts;
associating the acquired UUID to the network policy on the first network device;
applying the network policy for the VM on the first network device;
processing, by the first network device, a plurality of packets received at the first network device using the rule to:
make a determination that each packet of the plurality of packets comprises the identifier of the VM; and,
based on the determination, make a decision to perform the action on the plurality of packets;
subscribing, by the first network device and based on the associating of the acquired UUID and the applying of the network policy, to receive notifications from the VM management software of changes to a configuration of the VM corresponding to the acquired UUID;
receiving notification, by the first network device and from the VM management software, of a configuration change made to the VM corresponding to the acquired UUID;
updating, by the first network device, the network policy of the VM to reflect the configuration change of the VM;
making a determination, by the first network device, that there is a second network device that requires the network policy for the VM; and
initiating, by the first network device and based on the determination, a distribution of the network policy to the second network device,
wherein, after the distribution, the network policy is applied on the second network device.

15. The non-transitory computer readable medium of claim 14, the method further comprising:
- subscribing, by the second network device, after receiving the network policy from the first network device, to receive notifications from the VM management software of changes to the configuration of the VM corresponding to the acquired UUID;
- receiving notification at the second network device from the VM management software that the VM is migrating;
- detecting, by the second network device, that the VM has migrated from the first host to a second host connected to the second network device;
- identifying, using the acquired UUID, the network policy associated with the VM; and
- applying the network policy for the VM on the second network device.

16. The non-transitory computer readable medium of claim 14, wherein the network policy comprises an access control list (ACL).

17. The non-transitory computer readable medium of claim 14, wherein the configuration change is one selected from a group consisting of a name change, a location change, and a networking configuration change.

* * * * *